Figure 1:
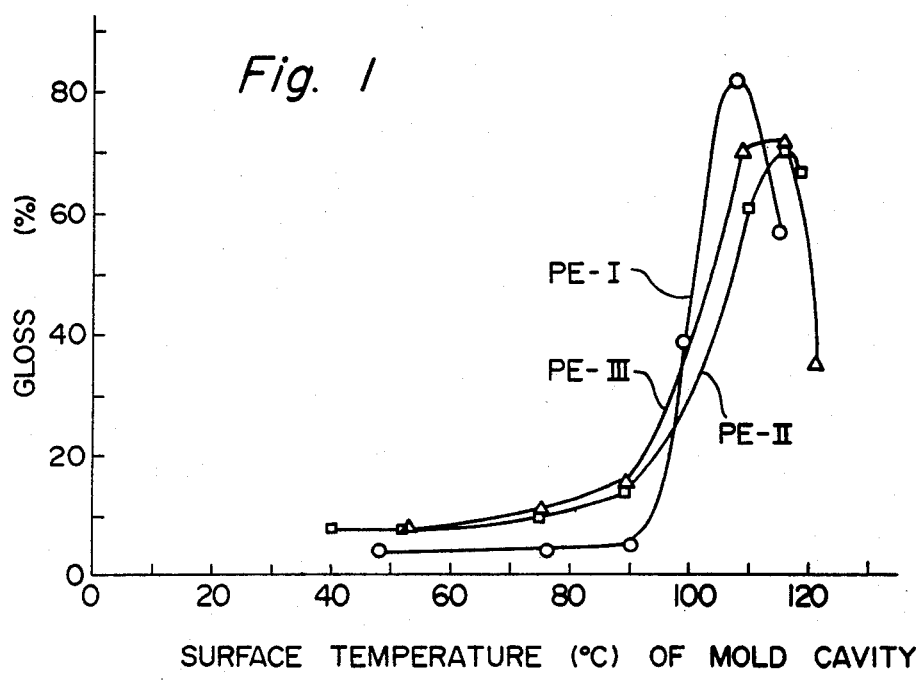

United States Patent [19]

Masumoto et al.

[11] Patent Number: 4,517,151
[45] Date of Patent: May 14, 1985

[54] METHOD FOR MOLDING HOLLOW BLOW-MOLDED ARTICLES

[75] Inventors: Kazuhiro Masumoto, Ohtake; Mituaki Fujimura, Iwakuni; Masauki Sawazaki, Iwata, all of Japan

[73] Assignees: Mitsui Petrochemical Industries, Ltd., Tokyo; Yazaki Plastics Industries Co., Ltd., Shizuoka, both of Japan

[21] Appl. No.: 445,972

[22] Filed: Dec. 1, 1982

[30] Foreign Application Priority Data

Dec. 4, 1981 [JP] Japan .................... 56-195452
Mar. 15, 1982 [JP] Japan .................... 57-41138

[51] Int. Cl.$^3$ ............................. B29C 17/07
[52] U.S. Cl. .................................... 264/540
[58] Field of Search ............ 264/523, 532, 535, 537, 264/538, 540, 542, 543

[56] References Cited

U.S. PATENT DOCUMENTS 4,305,902 12/1981 Uhlig ..................... 264/540 X
4,357,288 11/1982 Oas et al. ................. 264/537 X
4,385,089 5/1983 Bonnebat et al. ........... 264/523 X

FOREIGN PATENT DOCUMENTS 109065 3/1975 Japan .
50-26864 3/1975 Japan ..................... 264/532
84925 7/1981 Japan .

*Primary Examiner*—Jan Silbaugh
*Attorney, Agent, or Firm*—Sherman & Shalloway

[57] ABSTRACT

A blow molding method comprising introducing a hot parison of a thermoplastic crystalline olefin resin into a mold cavity and blow molding it, characterized in that the blow molding is carried out under such temperature conditions that the surface temperature, T°C., of the mold cavity satisfies the following expression (1), $$T_c - T_1 - \Delta T < T < T_c + T_2 \qquad (1)$$

wherein $T_c$ is the DSC crystallizing temperature in °C. of the olefin resin, $T_1$ is 20° C. when the olefin resin is a $C_2$ olefin and 30° C. when it is another olefin resin, $T_2$ is 10° C., and $\Delta T$ is a corrected value in °C. which is represented by the following equation (2) and holds good only when a mold having a heat insulating layer on the surface of its cavity is used, $$\Delta T = (-12.7 \log 10\lambda - 15.2 + 25t) \qquad (2)$$

wherein $\lambda$ is the heat conductivity of the heat insulating layer in cal/cm·sec·°C., and t is the thickness in cm of the heat-insulating layer, and a hollow blow-molded article of a thermoplastic crystalline olefin resin produced by the aforesaid method.

2 Claims, 4 Drawing Figures

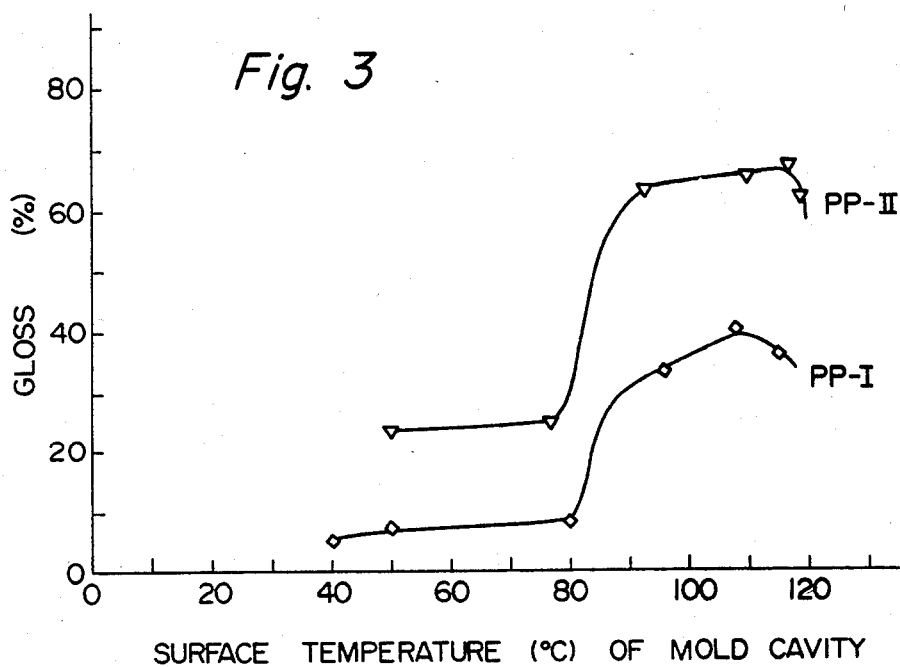
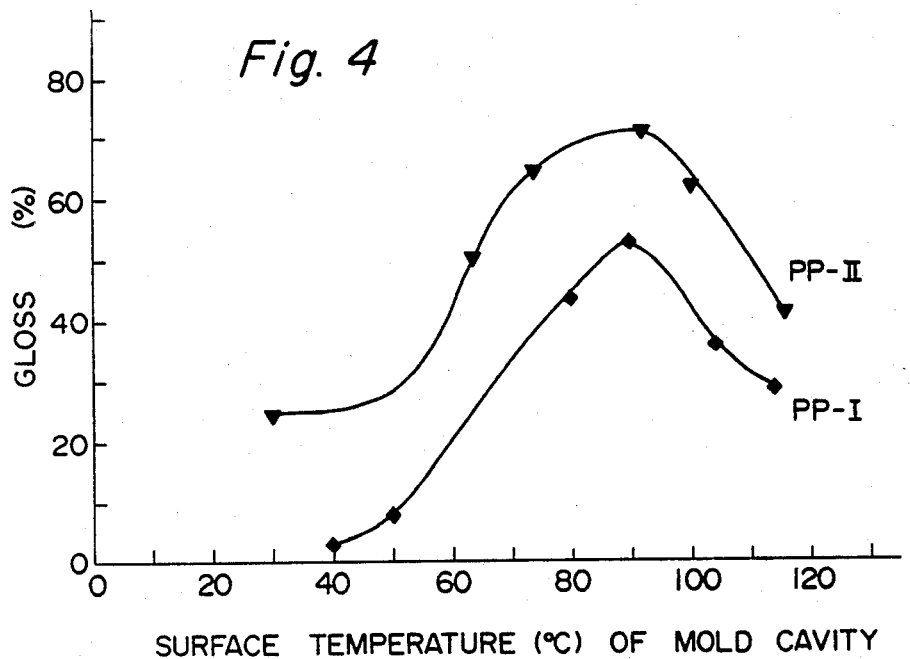

METHOD FOR MOLDING HOLLOW BLOW-MOLDED ARTICLES

This invention relates to an improved blow-molding method by which hollow articles having excellent surface gloss and improved properties and a uniform density in their thickness direction can be produced by simple means with a good reproducibility of quality. The invention also relates to hollow blow-molded articles provided by the aforesaid improved blow-molding method.

More specifically, this invention pertains to an improved blow-molding method which comprises introducing a hot parison of a thermoplastic crystalline olefin resin into a mold cavity and blow-molding it, characterized in that the blow molding is carried out under such temperature conditions that the surface temperature, T °C., of the mold cavity satisfies the following expression (1), $$T_c - T_1 - \Delta T < T < T_c + T_2 \tag{1}$$

wherein $T_c$ is the DSC crystallizing temperature in °C. of the olefin resin, $T_1$ is 20° C. when the olefin resin is a $C_2$ olefin and 30° C. when it is another olefin resin, $T_2$ is 10° C., and $\Delta T$ is a corrected value in °C. which is represented by the following equation (2) and holds good only when a mold having a heat insulating layer on the surface of its cavity is used, $$\Delta T = (-12.7 \log_{10} \lambda - 15.2 + 25t) \tag{2}$$

wherein $\lambda$ is the heat conductivity of the heat insulating layer in cal/cm·sec·°C., and t is the thickness in cm of the heat-insulating layer.

This invention also pertains to a hollow blow-molded article of a thermoplastic crystalline olefin resin which can be obtained by the above molding method easily with a good reproducibility of quality, characterized in that (i) its outside surface has a gloss, determined in accordance with ASTM D523 at an incidence angle of 45°, of at least about 30%, and (ii) the density of its outside surface layer is ±0.25% of the density of its inside surface layer.

It has been known to produce hollow plastic articles industrially by forcing a hot parison of a thermoplastic resin into a mold cavity, usually cooled at a temperature of less than about 20° C., and blow-molding it. Hollow blow-molded articles of termoplastic crystalline resins, especially thermoplastic crystalline olefin resins, have found extensive use in various applications, but have not proved to be entirely satisfactory in regard to their outside surface gloss.

Attempts have been made to improve the outside surface gloss of these hollow blow-molded articles by modifying the plastic molding materials used for blow molding. It has been extremely difficult, however, to improve gloss satisfactorily without adversely degrading the inherent desirable properties of the molding materials.

Some proposals have been made to improve the outside surface gloss of a hollow blow-molded article by improving the structure of that surface of the cavity of a mold which makes contact with the parison.

For example, Japanese Laid-Open Patent Publication No. 109065/1976 discloses a method for producing a blow-molded article having a surface gloss in which blow molding is carried out by using a mold having its inside surface (the surface of the mold cavity) coated with a three-layer surface-smoothing material which is prepared from a resin paint or an adhesive and composed of an undercoat layer as an instantaneous heat insulating layer, an intermediate coat layer as an elastic layer and a top coat layer as mirror-surface layer. According to this method, a resin having good adhesion to the inside surface of the mold and the intermediate coat layer, such as an epoxy resin, a phenolic resin, an acrylic resin or a polyester resin, is selected and the undercoat layer is prepared from it. On top of the undercoat layer, the intermediate coat layer is formed from a material which has rubbery elasticity and dynamical strength and is well adherent to the undercoat layer and the top coat layer. On top of the intermediate coat layer is formed the top coat layer made from a material which well adheres to the intermediate coat layer of a lacquer or enamel of the melamine, acrylic or polyester type and can provide a mirror surface by baking. The invention of this Japanese patent document contemplates the improvement of the outside surface gloss of a hollow blow-molded article by using a mold having the resulting three-layer coating on that surface of the mold cavity which makes contact with the hot parison. With this proposal, however, many troubles occur in the formation of the three-layer surface coating, the selection of the resin therefor, the durability of the resulting surface coating, etc., and the method disclosed there is not suitable for industrial practice.

Japanese Laid-Open Patent Publication No. 84925/1981 also proposes the enhancement of the outside gloss of a hollow blow-molded article by improving that surface of a mold cavity which makes contact with the hot parison. This patent document states that according to the conventional practice, the hot parison is blow-molded by forcing it into a mold cavity cooled at less than about 20° C., and if the temperature of the mold cavity is made nearly equal to that of the parison, a reduction in the gloss of the surface of a molded article by rapid cooling can be avoided, but that this technique cannot be used in practice because cooling of the molded article is time-consuming and the productivity is decreased. It also states that according to the invention disclosed therein, the surface gloss is improved not by the temperature adjustment of the mold but by the modification of the structure of the mold, and proposes a blow-molding mold in which a part or the whole of the mold cavity is of a heat-insulating structure, and the molding surface of the portion having the heat-insulating structure is a mirror surface. It shows an embodiment in which blow molding is carried out by using such a mold at a mold temperature of 15° C. However, even when a heat-insulating structure is formed on the mold cavity, if the temperature of the mold is as low as in the prior art, it is difficult in practice to obtain a hollow molded article having a high level of surface gloss. When a hollow molded article having a high expansion ratio is to be produced, the parison is cooled by the blowing air before it contacts the surface of the mold cavity. In this case, therefore, a hollow molded article having a high level of surface gloss is difficult to obtain, either.

The present inventors made investigations in order to provide a blow molding method which can give hollow blow-molded articles having excellent outside surface gloss and other excellent properties by simple mean with a good reproducibility of quality without the need to modify the surface structure of the mold cavity as in the above patent document on the basis of a different concept from that shown in the above patent document.

These investigations have led to the discovery that as will be described in detail hereinafter with reference to the accompanying drawings, in the blow molding of a thermoplastic crystalline olefin resin, there is a critical and unique correlation between the surface temperature of the cavity of a mold (i.e., that surface which contacts the hot parison) and the gloss of the outside surface of the resulting molded article (i.e., that surface which contacts the surface of the mold cavity), and that when the surface temperature of the mold cavity does not satisfy this relation and is either too low or too high, the gloss of the resulting blow-molded article is considerably decreased.

It has also been found that a blow-molded article having improved properties and excellent outside surface gloss and a substantially uniform density in its thickness direction can be provided by simple means with a good reproducibility of quality by performing blow molding under such temperature conditions that the surface temperature of the mold cavity satisfies the aforesaid unique correlation.

It is an object of this invention to provide an improved method for blow molding, and an improved hollow blow-molded article.

The above and other objects and advantages of this invention will become more apparent from the following description.

In the method of this invention which comprises introducing a hot parison of a thermoplastic crystalline olefin resin into a mold cavity and blow molding it, the blow molding is carried out under such temperature conditions that the surface temperature, T in °C., of the mold cavity satisfies the following expression (1)

$$T_c - T_1 - \Delta T < T < T_c + T_2 \quad (1)$$

wherein $T_c$ is the DSC crystallizing temperature in °C. of the olefin resin, $T_1$ is 20° C. when the olefin resin is a $C_2$ olefin and 30° C. when it is another olefin resin, $T_2$ is 10° C., and $\Delta T$ is a corrected value in °C. which is represented by the following equation (2) and holds good only when a mold having a heat insulating layer on the surface of its cavity is used, $$\Delta T = (-12.7 \log_{10}\lambda - 15.2 + 25t) \quad (2)$$

wherein $\lambda$ is the heat conductivity of the heat insulating layer in cal/cm. sec. °C., and t is the thickness in cm of the heat-insulating layer.

The thermoplastic crystalline olefin resin used in this invention may, for example, include crystalline homo- or co-polymers (including block copolymers) of olefins having 2 to 6 carbon atoms, preferably 2 or 3 carbon atoms, and blends of these with each other or with small amounts, for example up to about 30% by weight, of other polymers compatible therewith. Specific examples of such olefin resins are low-density ethylene resins (produced by any of high-pressure, medium-pressure and low-pressure methods), medium-density ethylene resins, high-density ethylene resins, propylene resins, 1-butene resins, 4-methyl-1-pentene resins, and blends of at least two of these resins. Examples of the other polymers which can be used as blends with these olefin resins are an ethylene-vinyl acetate copolymer, a low crystalline or amorphous ethylene-propylene or ethylene-1-butene copolymer, and polyisobutylene.

According to this invention, a hollow blow-molded article having excellent outside surface gloss and excellent properties can be obtained by simple means with a good reproducibility of quality without the need to change the design of the surface structure of a blow-molding mold cavity by blow-molding the thermoplastic olefin resin exemplified above under the conditions satisfying the expression (1). The resulting blow-molded article has a nearly uniform density in its thickness direction and improved tensile properties such as improved stress at yield, strength at break and elongation at break and improved buckling strength, hardness and falling strength in addition to its excellent surface gloss.

In the expression (1) given hereinabove, the DSC crystallization temperature, $T_c$ (°C.), of the olefin resin used is the peak temperature of a thermogram obtained in accordance with ASTM D-3417 using a differential scanning calorimeter (DSC). $T_1$ is the temperature of the olefin resin which differs according to the kind of the olefin resin. When the olefin resin is a $C_2$ olefin resin (a homo- or co-polymer of olefin or a blend thereof, which contains at least 50 mole % of a $C_2$ component), $T_1$ is 20° C., and when it is another olefin resin (a homo- or co-polymer of olefin or a blend thereof, which contains at least 50 mole % of a component having at least 3 carbon atoms), it is 30° C. $T_2$ is 10° C. $\Delta T$ is a corrected value represented by equation (2), which holds good only when the mold cavity has a heat insulating layer on its surface. When no heat insulating layer is provided (for example, when the surface of the mold cavity is smoothed by such means as surface buffing or mirror surface finishing or the surface of the mold cavity is subjected to mirror surface finishing by plating such as chrome plating), $\Delta T$ is zero. $\Delta T$ is a value applicable only when a heat insulating layer is provided on the surface of the mold cavity. It is derived from the heat conductivity ($\lambda$) of the heat insulating layer in cal/cm·sec·°C. which is determined according to the kind of the material constituting the heat insulating layer and the thickness, t in centimeters, of the heat insulating layer. For example, an enamelled heat insulating layer has a $\lambda$ of $2 \times 10^{-3}$ cal/cm·sec·°C., and a heat insulating layer having an epoxy resin coating has a $\lambda$ of $4.2 \times 10^{-4}$ cal/cm·sec·°C. The $\lambda$ inherent to such a material is known, and shown, for example, in Manual of Chemical Engineering (edited by the Japanese Association of Chemical Engineering, published by Maruzen Co., Ltd.). Examples of such a material capable of forming the heat insulating layer are glass ($\lambda = 1.8 \times 10^{-3}$ cal/cm·sec·°C.), acrylic resins ($\lambda = 4.2 \times 10^{-4}$), fluorocarbon resins ($\lambda = 7.8 \times 10^{-4}$), and silicon resin ($\lambda = 3.7 \times 10^{-4}$).

Normally, the upper limit of the surface temperature T(°C.) of the mold cavity represented by the expression (1) in this invention is considerably lower than the temperature (a point in the vicinity of the peak temperature, $T_m$, of a thermogram determined in accordance with ASTM D-3412 using a differential scanning calorimeter; the vicinity of $T_m$ means $T_m + 50 - 100$° C.) of the hot parison of the olefin resin. Accordingly, from the standpoint of improving the gloss of the molded article, the idea of the present invention differs from the conventional thought that the reduction in gloss can be avoided if the temperature of the mold is made nearly equal to the temperature of the parison as mentioned above with regard to the disclosure of Japanese Laid-Open Patent Publication No. 84925/1981.

This characteristic of the present invention, that is, the existence of a critical and unique correlation between the surface temperature of the mold cavity and the gloss of the outside surface of the resulting molded article, will be described in detail below with reference to some of the Examples and Comparative Examples given hereinafter taken in conjunction with the accompanying drawings.

FIG. 1 is a graph showing examples of the relation between the surface temperature of the mold cavity and the gloss of the outside surface of the blowmolded article when a high-density polyethylene resin is blow-molded using a mold which has no heat insulating layer and in which the surface of the mold cavity is mirror surface finished PE-I, PE-II and PE-III are curves showing the above relation in the case of using high-density polyethylene resins of different properties in Experiment I, Experiment VI, and Experiment VIII, respectively.

As is clear from FIG. 1, there is a critical correlation having a peak at a temperature considerably lower than the temperature of the hot parison (202°–206° C.) between the surface temperature of the mold cavity and the gloss of the outside surface of the blow-molded article.

Figure 2:
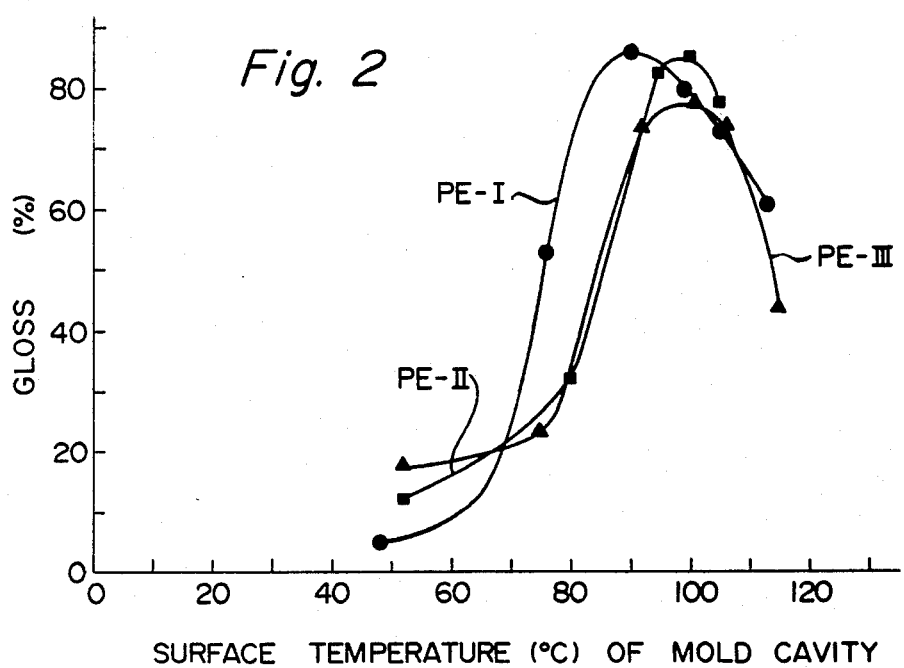

FIG. 2 shows curves showing the same relation as in FIG. 1 in the case of using the same high-density polyethylene resins as in FIG. 1 (PE-I refers to Experiment II; PE-II, to Experiment VII; and PE-III, to Experiment IX) but a mold in which an enamelled heat insulating layer is formed on the surface of the mold cavity. FIG. 2 also shows that between the surface temperature of the mold cavity and the gloss of the outside surface of the blow-molded article, there is a critical correlation having a peak at a temperature considerably lower than the temperature of the hot parison (202°–206° C.).

FIG. 3 is a graph showing examples of the relation between the surface temperature of the mold cavity and the gloss of the outside surface of the blowmolded article when a crystalline polypropylene resin is blow-molded by using a mold which has no heat insulating layer and in which the surface of the mold cavity is chrome-plated to provide a mirror surface. In the graph, PP-I, and PP-II are curves showing the above relation in the case of using crystalline polypropylene resins of different properties in Experiment III and Experiment X, respectively. In FIG. 3, broadening is noted at the peak portion, but it is seen that between the surface temperature of the mold cavity and the gloss of the outside surface of the blow-molded article, there is a critical correlation having a peak width at a temperature considerably lower than the temperature of the hot parison (202°–206° C.).

FIG. 4 shows curves indicating the same relation as in FIG. 3 in the case of using the same crystalline polypropylene resins as in FIG. 3 (PP-I refers to Experiment IV, and PP-II, to Experiment XI) but using a mold in which an enamelled heat insulating layer is formed on the surface of the mold cavity. It is also seen from FIG. 4 that between the surface temperature of the mold cavity and the gloss of the outside surface of the blow-molded article, there is a critical correlation having a peak at a temperature considerably lower than the temperature of the hot parison (202°–203° C.).

It is seen from FIGS. 1 to 4 and Tables 1, 2, 4 and 5 which give the results of the Experiments mentioned above with regard to these drawings that as a result of the surface temperature, T°C., of the mold cavity satisfying the expression (1), hollow blow-molded articles can be obtained which have improved properties and in which their density in the thickness direction is nearly uniform.

According to a preferred embodiment of this invention, a hollow blow-molded article of a thermoplastic crystalline olefin resin characterized by (i) having an outside surface gloss, determined in accordance with ASTM D523 at an incidence angle of 45°, of at least about 30% and (ii) the density of its outside surface layer being ±0.25% of the density of its inside surface layer can be obtained by simple means with a good reproducibility of quality without the need for the complex and costly formation of a heat insulating layer on the surface of the mold cavity when the olefin resin is blowmolded by a technique known per se under such conditions specified in the present invention that the surface temperature, T°C., of the mold cavity meets the expression (1) given hereinabove.

In the practice of the method of this invention, a hollow blow-molded article having excellent improved properties can be produced in a blow-molding apparatus known per se by means and operations known per se except that the blow molding is carried out under such conditions that the surface temperature, T °C., of the mold cavity satisfies the expression (1). There is no particular restriction on the blow molding apparatus, means and operations used.

The blow molding apparatus used in this invention may be any known blow molding apparatus in which the temperature of the surface of the mold cavity can be adjusted to the temperature conditions defined by the expression (1). For example, it may be any of blow molding machines of various extruding types, such as the screw, ram, accumulator, or screw-in-line type. The mold used in the molding method of this invention may be any mold equipped with a temperature control mechanism permitting adjustment of the mold cavity temperature to the above-specified range, for example, a mechanism for steam heating, electrical heating, high-frequency heating, or oil heating. Such a mold may be made of iron, aluminum, chromium, and zinc, or an alloy consisting of two or more of these.

According to one embodiment of the method of this invention, a hollow molded article having improved surface gloss and impact strength can be obtained by an ordinary method using a mold in which the surface temperature of the cavity is adjusted to the temperature range defined by the expression (1) given hereinabove, more specifically by a method which comprises melting a crystalline thermoplastic resin at its suitable melting temperature (for example, at about 160 to 240° C. in the case of polyethylene or polypropylene), extruding the resulting hot parison through a heated blow molding die such as a crosshead die or a spider die, into the mold cavity having a surface temperature adjusted to the range defined by the expression (1) above, blowing a pressurized gas into the parison, and withdrawing the resulting article after the resin has solidified. A similar effect can be obtained in the case of producing a multilayer hollow article, particularly a hollow article having at least three layers with its inside and outside layers being made from the same resin, by a co-extrusion technique.

Thus, according to the molding method of this invention, there can be obtained easily with a good reproducibility of quality hollow articles having much better surface gloss and density uniformity in the thickness direction than in the case of the conventional techniques as well as improved tensile strength, buckling strength and impact stength. Such molded articles can be used in fields in which the appearance of the articles is also of importance, for example as automobile parts and accessories, household electrical appliances, packing containers, receptacles for cosmetics, furniture, tableware, tanks, etc.

The following Examples and Comparative Examples illustrate the blow molding method of this invention more specifically.

EXPERIMENT I (EXAMPLES 1 TO 3 AND COMPARATIVE EXAMPLES 1 TO 5)

In this experiment, 12-ounce rectangular polyethylene bottles were made by blow-molding polyethylene using a mold ($\Delta T=0$) having a mold cavity whose surfaces had been mirror surface-finished by a chrome plating layer 20 microns thick.

High-density polyethylene, PE-I, (tradename Hizex 8000F, a product of Mitsui Petrochemical Industries, Ltd.; MFI=0.03 g/10 minutes, density=0.950 g/cm$^3$, $T_1=20°$ C., $T_c=114.5°$ C., $T_m=128.4°$ C.) was melted in an extruder having an inside cylinder diameter of 45 mm at a prescribed temperature of 190° C., and a parison was extruded through the die kept at a temperature of 190° C.

The hot parison at 206° C. was forced into the mold cavity having each of the surface temperatures T°C. shown in Table 1 and blow-molded. T calculated from the expression (1) is: $94.5 < T < 124.5$ (°C.).

EXPERIMENT II (EXAMPLES 4 TO 8 AND COMPARATIVE EXAMPLES 6 TO 8)

The procedure of Experiment I was repeated except that the surface of the mold cavity was mirror surface-finished by providing an enamelled heat insulating layer ($\Delta T=20°$ C.) having a thickness of 400 microns instead of chrome-plating. T calcuated from the expression (1) is: $74.5 < T < 124.5$ (°C.). The results are shown in Table 1 and curve PE-I in FIG. 2.

EXPERIMENT III (EXAMPLES 9 TO 11 AND COMPARATIVE EXAMPLES 9 TO 11)

Cylindrical polypropylene bottles (400 ml) were made by blow-molding polypropylene using a mold ($\Delta T=0$) having a mold cavity whose surface had been mirror surface-finished by providing a chrome-plated layer having a thickness of 20 microns.

Crystalline polypropylene, PP-I, (tradename Mitsui Petrochemical Polypro SB 210, a product of Mitsui Petrochemical Industries, Ltd.; MFI=0.5 g/10 minutes, density=0.910 g/cm$^3$, $T_1=30°$ C., $T_c=111.5°$ C., $T_m=161.1°$ C. and 126.1° C.) was melted in an extruder having an inside cylinder diameter of 45 mm at a prescribed temperature of 200° C., and a parison was extruded through the die kept at 210° C.

The hot parison at 203° C. was forced into the mold cavity whose surface temperature T was as shown in Table 2 to blow mold it. T calculated from the expression (1) is: $81.5 < T < 121.5$ (°C.). The results are shown in Table 2 and curve PP-I in FIG. 3.

EXPERIMENT IV (EXAMPLES 12 TO 15 AND COMPARATIVE EXAMPLES 12 AND 13)

The procedure of Experiment III was repeated except that the surface of the mold cavity was mirror surface-finished by providing an enamelled heat insulating layer ($\Delta T=20°$ C.) having a thickness of 400 microns instead of chrome-plating. T calculated from the expression (1) is: $61.5 < T < 121.5$ (°C.). The results are shown in Table 2 and curve PP-I in FIG. 4.

EXPERIMENT V (EXAMPLES 16 AND 17 AND COMPARATIVE EXAMPLES 12A AND 13A)

Poly(4-methyl-1-pentene) resin (tradename TPX MX002, a product of Mitsui Petrochemical Industries, Ltd.; $T_1=30°$ C., $T_c=195°$ C., $T_m=220°$ C.) was melted in an extruder having an inside cylinder diameter of 90 mm at a prescribed temperature of 250° C. A parison was extruded through the die kept 260° C. and then blow-molded in a panel-shaped mold ($\Delta T=0$) having a mold cavity whose surface had been mirror surface-finished with a chromeplated layer having a thickness of 20 microns. T calculated from the expression (1) is: $165 < T < 205$ (°C.). The hollow article obtained above had the shape of a panel ($520 \times 340 \times 10$ mm). The results are shown in Table 3.

EXPERIMENT VI (EXAMPLES 18 TO 20 AND COMPARATIVE EXAMPLES 14 TO 16)

High-density polyethylene, PE-II (tradename Hizex 6200B, a product of Mitsui Petrochemical Industries, Ltd.; MFI=0.40 g/10 minutes, density 0.958 g/cm$^3$, $T_1=20°$ C., $T_c=116.4°$ C., $T_m=130.9°$ C.) was blow-molded using a mold ($\Delta T=O$) having a mold cavity whose surface had been mirror surface-finished by providing a chrome-plated layer having a thickness of 20 mircons, to produce cylindrical bottles having a capacity of 300 ml. T calculated from the expression (1) is: $96.4 < T < 126.4$ (°C.).

The polyethylene resin was melted in an extruder having an inside cylinder diameter of 45 mm at a prescribed temperature of 190° C., extruded through the die kept at 190° C. and introduced in the aforesaid mold for blow molding. The hot parison at 202° C. was introduced into the mold cavity whose surface temperature T was as shown in Table 4.

The results are shown in Table 4 and curve PE-II of FIG. 1.

EXPERIMENT VII (EXAMPLES 21 TO 24 AND COMPARATIVE EXAMPLE 18)

The procedure of Experiment VI was repeated except that the mold was replaced by a mold for making 400 ml. cylindrical bottles, in which the mold cavity had an enamelled heat insulating layer ($\Delta T=20°$ C.) having a thickness of 400 microns. T calculated from the expression (1) is: $76.4 < T < 126.4$ (°C.).

The results are shown in Table 4 and curve PE-II in FIG. 2.

EXPERIMENT VIII (EXAMPLES 25 to 27 and COMPARATIVE EXAMPLES 20 and 21)

The procedure of Experiment VI was repeated except that instead of the high-density polyethylene (PE-II), high-density polyethylene, PE-III, (MFI=0.35 g/10 minutes, density=0.946 g/cm$^3$, $T_1=20°$ C., $T_c=118.2°$ C., $T_m=133.5°$ C.) was used. T calculated from the expression (1) is: $98.2<T<128.2$ (°C.).

The results are shown in Table 5 and curve PE-III in FIG. 1.

EXPERIMENT IX (EXAMPLES 28 TO 31 AND COMPARATIVE EXAMPLE 23)

The procedure of Experiment VII was repeated except that the same high-density polyethylene resin PE-III was used instead of the high-density polyethylene resin PE-II. T calculated from the expression (1) is: $78.4<T<126.4$ (°C.).

The results are shown in Table 5 and curve PE-III in FIG. 2.

EXPERIMENT X (EXAMPLES 32 TO 35 AND COMPARATIVE EXAMPLES 25 AND 26)

The procedure of Experiment VI was repeated except that crystalline polypropylene, PP-II, (MFI=0.50 g/10 minutes, density=0.910 g/cm$^3$, $T_1=30°$ C., $T_c=110.6°$ C., $T_m=159.8°$ C.) was used instead of the high-density polyethylene PE-II. T calculated from the expression (1) is: $80.6<T<120.6$ (°C.).

The results are shown in Table 6 and curve PP-II in FIG. 3.

EXPERMIMENT XI (EXAMPLES 36 TO 40 AND COMPARATIVE EXAMPLE 27)

The procedure of Experiment X was repeated except that the same mold as used in Experiment VII [with an enamelled heat insulating layer ($\Delta T=20°$ C.)] as used in Experiment VII was used instead of the mold used in Experiment X. T calculated from the expression (1) is: $60.6<T<120.6$ (°C.).

The results are shown in Table 6 and curve PP-II in FIG. 4.

The various properties of the molded articles given in the following Tables were determined by the following methods.

Gloss: ASTM D-523 at an incidence angle of 45°.
Tensile properties: ASTM D-638.
Buckling strength: ASTM D-695.
Surface hardness: ASTM D-2240, Type D.
Izod impact strength: ASTM D-256.
Falling strength:

Method A applies to Experiments III and IV; method B, to Experiments I and II; method C, to Experiments VI to IX; and method D, to Experiments X and XI.

Method A:

Cylindrical bottles of polypropylene (400 ml in capacity) were each filled with water to the full, and their mouth portions were sealed. Ten such bottles were each let fall perpendicularly onto a concrete surface from a height of 14 meters, and the ratio of bottles which broke was calculated and defined as the falling strength.

Method B:

Rectangular bottles (12-ounce in capacity) were filled with water to the full and their mouth portions were sealed. One such bottle was let fall perpendicularly onto a concrete surface from a certain predetermined height. When it broke, the next bottle was let fall from a height 30 cm below the predetermined height. On the other hand, when it did not break, the next bottle was let fall from a height 30 cm above the predetermined height. This falling test was conducted on 30 such bottles, and the height which led to the breaking of 15 out of the 30 bottles was determined and defined as the falling strength.

Method C:

Molded bottles were filled with water at 0° C. to the full, and their mouth portions were sealed. Fifteen such bottles were let fall perpendicularly onto a concrete surface from a height of 10 meters, and the ratio of bottles which broke was calculated and defined as the falling strength.

Method D:

Molded bottles were filled with water to the full and their mouth portions were sealed. One such bottle was let fall perpendicularly onto a concrete surface from a certain predetermined height. When it broke, the next bottle was let fall from a height 20 cm below the predetermined height. On the other hand, when it did not break, the next bottle was let fall from a height 20 cm above the predetermined height. This falling test was conducted on 30 such bottles, and the height which led to the breaking of 15 out of the 30 bottles was determined and defined as the falling strength.

TABLE 1

| Experiment (Ex. = Example; CEx. = Comparative Example) | T(°C.) | Gloss (%) Outside surface of the article | Gloss (%) Inside surface of the article | Tensile properties Stress at yield (kg/cm$^2$) | Tensile properties Stress at break (kg/cm$^2$) | Tensile properties Elongation at break (%) | Buckling strength (kg) | Hardness (Shore D) | Falling strength (m) | Density (g/cc at 23° C.) Outside | Density (g/cc at 23° C.) Inside | Difference in density (%)(*) |
|---|---|---|---|---|---|---|---|---|---|---|---|---|
| I CEx. 1 | 20 | — | — | — | — | — | — | 61 | 2.7 | — | — | — |
| CEx. 2 | 40 | — | — | 220 | 430 | 700 | 37 | 61 | 3.7 | — | — | — |
| CEx. 3 | 48 | 4 | 4 | 250 | 420 | 810 | 36 | 61 | — | 0.9404 | 0.9430 | 0.28 |
| CEx. 4 | 76 | 4 | 4 | 265 | 420 | 830 | 36 | 63 | 5.4 | 0.9405 | 0.9432 | 0.29 |
| CEx. 5 | 90 | 5 | 4 | 270 | 420 | 850 | — | 64 | — | 0.9430 | 0.9450 | 0.21 |
| Ex. 1 | 99 | 39 | 4 | 270 | 420 | 850 | — | 64 | — | 0.9446 | 0.9451 | 0.05 |
| Ex. 2 | 108 | 82 | 4 | 280 | 430 | 870 | 40 | 65 | >6.0 | 0.9471 | 0.9470 | 0.01 |
| Ex. 3 | 115 | 57 | 4 | 280 | 430 | 870 | 40 | 65 | >6.0 | 0.9478 | 0.9476 | 0.02 |
| II CEx. 6 | 20 | — | — | — | — | — | — | 61 | 2.5 | — | — | — |
| CEx. 7 | 40 | — | — | 230 | 440 | 750 | 35 | 62 | 3.5 | — | — | — |
| CEx. 8 | 48 | 5 | 4 | 240 | 430 | 820 | 35 | 61 | 3.4 | 0.9405 | 0.9433 | 0.30 |
| Ex. 4 | 76 | 53 | 4 | 260 | 420 | 850 | 37 | 62 | 5.3 | 0.9410 | 0.9433 | 0.24 |
| Ex. 5 | 90 | 86 | 4 | 270 | 420 | 860 | 37 | 63 | 5.5 | 0.9440 | 0.9461 | 0.22 |
| Ex. 6 | 99 | 80 | 4 | 280 | 430 | 860 | 39 | 65 | >6.0 | 0.9460 | 0.9475 | 0.16 |
| Ex. 7 | 105 | 73 | 4 | 280 | 420 | 870 | 42 | 65 | >6.0 | 0.9481 | 0.9485 | 0.04 |
| Ex. 8 | 113 | 61 | 4 | 285 | 420 | 870 | 42 | 66 | >6.0 | 0.9483 | 0.9483 | 0 |

(*) $\frac{\text{(Density of the inside)} - \text{(Density of the outside)}}{\text{(Density of the inside)}} \times 100$

TABLE 2

| Experiment (Ex. = Example; CEx. = Comparative Example) | | T(°C.) | Gloss (%) Outside surface of the article | Gloss (%) Inside surface of the article | Tensile properties Stress at yield (kg/cm²) | Tensile properties Stress at break (kg/cm²) | Tensile properties Elongation at break (%) | Buckling strength (kg) | Hardness (Shore D) | Falling strength (m) | Density (g/cc at 23° C.) Outside | Density (g/cc at 23° C.) Inside | Difference in density (%) |
|---|---|---|---|---|---|---|---|---|---|---|---|---|---|
| III | CEx. 9 | 40 | 5 | 5 | 290 | 380 | 510 | 110 | 65 | 100 | 0.9055 | 0.9088 | 0.36 |
|  | CEx. 10 | 50 | 7 | 7 | 270 | 400 | 700 | 130 | 65 | 90 | 0.9044 | 0.9070 | 0.29 |
|  | CEx. 11 | 80 | 8 | 7 | 270 | 380 | 620 | 135 | 66 | 80 | 0.9050 | 0.9074 | 0.26 |
|  | Ex. 9 | 96 | 33 | 7 | 270 | 380 | 630 | 140 | 66 | 70 | 0.9045 | 0.9060 | 0.17 |
|  | Ex. 10 | 108 | 40 | 6 | 270 | 310 | 600 | 160 | 68 | 70 | 0.9060 | 0.9055 | 0.06 |
|  | Ex. 11 | 115 | 36 | 6 | 270 | 310 | 580 | 180 | 69 | 60 | 0.9078 | 0.9080 | 0.02 |
| IV | CEx. 12 | 40 | 3 | 3 | 280 | 400 | 730 | 110 | 66 | 100 | 0.9053 | 0.9083 | 0.33 |
|  | CEx. 13 | 50 | 8 | 8 | 280 | 400 | 700 | 130 | 67 | 90 | 0.9065 | 0.9100 | 0.38 |
|  | Ex. 12 | 80 | 44 | 5 | 285 | 380 | 690 | 135 | 68 | 90 | 0.9099 | 0.9099 | 0 |
|  | Ex. 13 | 90 | 53 | 6 | 285 | 360 | 640 | 140 | 69 | 80 | 0.9098 | 0.9110 | 0.13 |
|  | Ex. 14 | 104 | 36 | 5 | 285 | 230 | 270 | 150 | 69 | 70 | 0.9110 | 0.9108 | 0.02 |
|  | Ex. 15 | 114 | 29 | 6 | 285 | 230 | 800 | 180 | 70 | 70 | 0.9109 | 0.9110 | 0.01 |

TABLE 3

| Experiment (Ex. = Example; CEx. = Comparative Example) | | T(°C.) | Gloss (%) Outside surface of the article | Gloss (%) Inside surface of the article | Tensile properties Stress at yield (kg/cm²) | Tensile properties Stress at break (kg/cm²) | Tensile properties Elongation at break (%) | Hardness (Shore D) | Izod impact strength (kg·cm/cm) | Density (g/cc at 23° C.) Outside | Density (g/cc at 23° C.) Inside | Difference in density (%) |
|---|---|---|---|---|---|---|---|---|---|---|---|---|
| V | CEx. 12a | 124 | 23 | 28 | 170 | 140 | 220 | 66 | 3 | 0.8343 | 0.8349 | 0.07 |
|  | CEx. 13a | 154 | 28 | 40 | 170 | 170 | 260 | 67 | 3 | 0.8348 | 0.8350 | 0.02 |
|  | Ex. 16 | 168 | 37 | 40 | 180 | 190 | 260 | 67 | 3 | 0.8349 | 0.8349 | 0 |
|  | Ex. 17 | 185 | 34 | 43 | 180 | 190 | 270 | 67 | 3 | 0.8347 | 0.8348 | 0.01 |

TABLE 4

| Experiment (Ex. = Example; CEx. = Comparative Example) | | T(°C.) | Gloss (%) Outside surface of the article | Gloss (%) Inside surface of the article | Tensile properties Stress at yield (kg/cm²) | Tensile properties Stress at break (kg/cm²) | Tensile properties Elongation at break (%) | Buckling strength (kg) | Falling strength (destruction ratio)(%) | Density (g/cc at 23° C.) Outside | Density (g/cc at 23° C.) Inside | Difference in density (%) |
|---|---|---|---|---|---|---|---|---|---|---|---|---|
| VI | CEx. 14 | 40 | 8 | 6 | 230 | 330 | 600 | 41 | 87 | 0.9413 | 0.9487 | 0.78 |
|  | CEx. 15 | 52 | 8 | 5 | 240 | 350 | 700 | 45 | 80 | 0.9416 | 0.9484 | 0.72 |
|  | CEx. 16 | 75 | 10 | 6 | 250 | 380 | 770 | 51 | 73 | 0.9435 | 0.9478 | 0.45 |
|  | CEx. 17 | 89 | 14 | 5 | 260 | 430 | 870 | 52 | 73 | 0.9478 | 0.9521 | 0.45 |
|  | Ex. 18 | 110 | 61 | 5 | 270 | 410 | 850 | 53 | 67 | 0.9538 | 0.9535 | 0.03 |
|  | Ex. 19 | 116 | 70 | 5 | 270 | 420 | 880 | 52 | 67 | 0.9540 | 0.9536 | 0.04 |
|  | Ex. 20 | 119 | 67 | 4 | 270 | 420 | 860 | 53 | 73 | 0.9567 | 0.9567 | 0 |
| VII | CEx. 18 | 52 | 12 | 6 | 235 | 350 | 800 | 60 | 60 | 0.9450 | 0.9494 | 0.46 |
|  | Ex. 21 | 80 | 32 | 6 | 245 | 380 | 800 | 67 | 60 | 0.9486 | 0.9507 | 0.22 |
|  | Ex. 22 | 95 | 83 | 6 | 250 | 350 | 750 | 69 | 53 | 0.9513 | 0.9529 | 0.17 |
|  | Ex. 23 | 100 | 85 | 6 | 260 | 350 | 730 | 72 | 33 | 0.9523 | 0.9532 | 0.09 |
|  | Ex. 24 | 105 | 78 | 6 | 280 | 370 | 770 | 75 | 40 | 0.9542 | 0.9546 | 0 |

TABLE 5

| Experiment (Ex. = Example; CEx. = Comparative Example) | | T(°C.) | Gloss (%) Outside surface of the article | Gloss (%) Inside surface of the article | Tensile properties Stress at yield (kg/cm²) | Tensile properties Stress at break (kg/cm²) | Tensile properties Elongation at break (%) | Buckling strength (kg) | Falling strength (destruction ratio)(%) | Density (g/cc at 23° C.) Outside | Density (g/cc at 23° C.) Inside | Difference in density (%) |
|---|---|---|---|---|---|---|---|---|---|---|---|---|
| VIII | CEx. 20 | 52 | 8 | 4 | 250 | 400 | 820 | 58 | 53 | 0.9449 | 0.9523 | 0.78 |
|  | CEx. 21 | 75 | 11 | 4 | 270 | 420 | 850 | 61 | 47 | 0.9470 | 0.9538 | 0.71 |
|  | CEx. 22 | 89 | 16 | 4 | 280 | 430 | 870 | 62 | 33 | 0.9522 | 0.9553 | 0.32 |
|  | Ex. 25 | 109 | 70 | 5 | 300 | 440 | 890 | 63 | 33 | 0.9560 | 0.9577 | 0.18 |
|  | Ex. 26 | 117 | 72 | 5 | 310 | 410 | 860 | 70 | 27 | 0.9584 | 0.9588 | 0.04 |
|  | Ex. 27 | 121 | 35 | 4 | 310 | 420 | 860 | 69 | 33 | 0.9625 | 0.9618 | 0.07 |
| IX | CEx. 23 | 52 | 18 | 4 | 270 | 350 | 710 | 75 | 53 | 0.9447 | 0.9524 | 0.81 |
|  | CEx. 24 | 75 | 24 | 4 | 280 | 390 | 850 | 78 | 40 | 0.9480 | 0.9520 | 0.42 |
|  | Ex. 28 | 92 | 74 | 3 | 280 | 400 | 850 | 84 | 40 | 0.9564 | 0.9577 | 0.14 |
|  | Ex. 29 | 101 | 78 | 4 | 280 | 410 | 880 | 86 | 40 | 0.9563 | 0.9574 | 0.11 |
|  | Ex. 30 | 106 | 74 | 4 | 300 | 390 | 850 | 94 | 33 | 0.9561 | 0.9571 | 0.10 |
|  | Ex. 31 | 115 | 44 | 3 | 300 | 400 | 850 | 93 | 40 | 0.9601 | 0.9608 | 0.07 |

TABLE 6

| Experiment (Ex. = Example; CEx. = Comparative Example) | | T(°C.) | Gloss (%) | | Tensile properties | | | Buckling strength (kg) | Falling strength (destruction ratio)(%) | Density (g/cc at 23° C.) | | Difference in density (%) |
| --- | --- | --- | --- | --- | --- | --- | --- | --- | --- | --- | --- | --- |
| | | | Outside surface of the article | Inside surface of the article | Stress at yield (kg/cm$^2$) | Stress at break (kg/cm$^2$) | Elongation at break (%) | | | Outside | Inside | |
| X | CEx. 25 | 52 | 24 | 14 | 310 | 460 | 650 | 108 | 113 | 0.9004 | 0.9035 | 0.34 |
| | CEx. 26 | 77 | 25 | 18 | 320 | 450 | 640 | 122 | 115 | 0.9024 | 0.9044 | 0.22 |
| | Ex. 32 | 93 | 64 | 18 | 330 | 490 | 680 | 127 | 126 | 0.9033 | 0.9051 | 0.20 |
| | Ex. 33 | 110 | 66 | 20 | 320 | 380 | 500 | 125 | 143 | 0.9038 | 0.9049 | 0.12 |
| | Ex. 34 | 117 | 68 | 19 | 330 | 370 | 510 | 125 | 141 | 0.9051 | 0.9052 | 0 |
| | Ex. 35 | 119 | 63 | 10 | 330 | 370 | 510 | 126 | 110 | 0.9057 | 0.9057 | 0 |
| XI | CEx. 27 | 30 | 25 | 12 | 310 | 410 | 610 | 150 | 128 | 0.9016 | 0.9046 | 0.33 |
| | Ex. 36 | 64 | 51 | 14 | 320 | 400 | 600 | 159 | 103 | 0.9030 | 0.9052 | 0.24 |
| | Ex. 37 | 74 | 65 | 13 | 330 | 420 | 560 | 178 | 150 | 0.9035 | 0.9052 | 0.19 |
| | Ex. 38 | 92 | 71 | 12 | 320 | 380 | 510 | 179 | 131 | 0.9034 | 0.9051 | 0.19 |
| | Ex. 39 | 100 | 63 | 11 | 330 | 340 | 490 | 194 | 100 | 0.9045 | 0.9059 | 0.15 |
| | Ex. 40 | 116 | 42 | 11 | 330 | 330 | 500 | 190 | 94 | 0.9050 | 0.9058 | 0.09 |

What is claimed is:

1. A blow molding method which comprises melt-extruding a hot parison of a thermoplastic crystalline olefin resin and introducing the as-extruded parison into a mold cavity and blow molding it under such temperature conditions that the surface temperature, T° C., of the mold cavity satisfies the following expression (1), $$T_c - T_1 - \Delta T < T < T_c + T_2 \qquad (1)$$

wherein $T_c$ is the DSC crystallizing temperature in °C. of the olefin resin, $T_1$ is 20° C. when the olefin resin is a $C_2$ olefin and 30° C. when it is another olefin resin, $T_2$ is 10° C., and $\Delta T$ is a corrected value in °C. which is represented by the following equation (2) and holds good only when a mold having a heat insulating layer on the surface of its cavity is used, $$\Delta T = (-12.7 \log_{10} \lambda - 15.2 + 25t) \qquad (2)$$

wherein $\lambda$ is the heat conductivity of the heat insulating layer in cal/cm·sec.·°C., and t is the thickness in cm of the heat-insulating layer.

2. The method of claim 1 wherein the thermoplastic crystalline olefin resin is a $C_2$-$C_6$ olefin resin.

* * * * *